Feb. 27, 1951 G. L. GRISDALE 2,543,456

OSCILLATION GENERATOR

Filed May 30, 1945

INVENTOR
GEORGE L. GRISDALE
BY
H. S. Grover
ATTORNEY

Patented Feb. 27, 1951

2,543,456

UNITED STATES PATENT OFFICE 2,543,456

OSCILLATION GENERATOR

George Lambert Grisdale, Great Baddow, Chelmsford, England, assignor to Radio Corporation of America, a corporation of Delaware Application May 30, 1945, Serial No. 596,687
In Great Britain May 8, 1944

Section 1, Public Law 690, August 8, 1946
Patent expires May 8, 1964

4 Claims. (Cl. 250—36)

This invention relates to electric oscillation generators, and particularly to such in which it is desired to utilize harmonics of the fundamental frequency or to select a particular harmonic of the said fundamental frequency.

The generator of the invention is applicable to a variety of purposes, amongst which may be mentioned crystal controlled frequency calibrators, driving circuits for radio-transmitters, frequency changing oscillators for radio-receivers, and so forth.

Thus, in a frequency calibrator, having a fundamental frequency of, say 1 mc./s. it may be necessary to select as calibrating frequencies for radio-receivers and other radio-apparatus any one of the harmonics of 2, 3, 4, . . . 25, 26, etc., mc./s. These different harmonics vary very greatly in amplitude, being generally of much greater amplitude at the lower frequencies than at the higher, where indeed they may be of insufficient amplitude to be of any use. In any case, this variation in amplitude is an undesirable feature.

According to the invention, a crystal controlled electric oscillation generator having a tuned circuit including an inductive branch and capacitative branch, has in series with the capacitative branch, an inductor, the arrangement being such that by reason of the lower impedance of the capacitative branch than the inductive branch to currents of the harmonic frequencies the harmonic component frequencies passing through the said capacitative branch also pass through the said inductor, across which electro-motive forces of harmonic frequencies are developed, harmonic frequency output being taken from across said inductor.

The inductor should have a lower reactance value at the fundamental frequency than has the capacitor so that its presence shall not substantially detune the oscillator from a desired resonant frequency.

The said inductor may form the inductive element of a resonant circuit, and the said resonant circuit may be variably tunable so that a desired harmonic only may be selected.

The said resonant circuit may be series resonant so as to by-pass unwanted harmonics or parallel resonant.

Two generators according to the invention will be described in connection with Figures 1 and 2 of the accompanying drawing.

Figure 1:
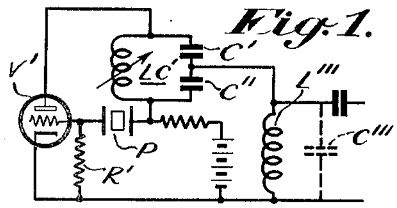
Figure 2:
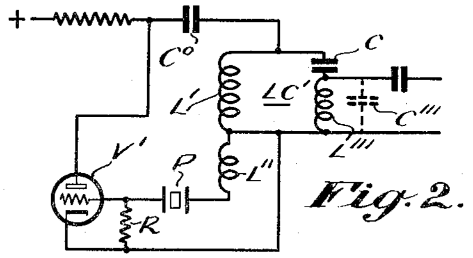
Figure 3:
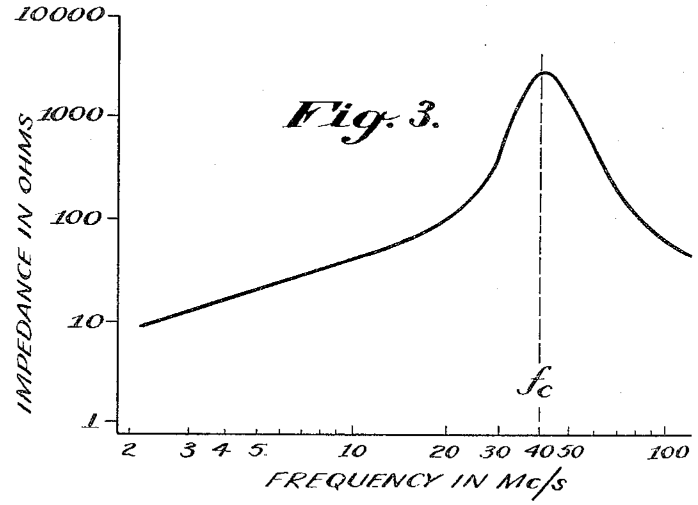
Figure 5:
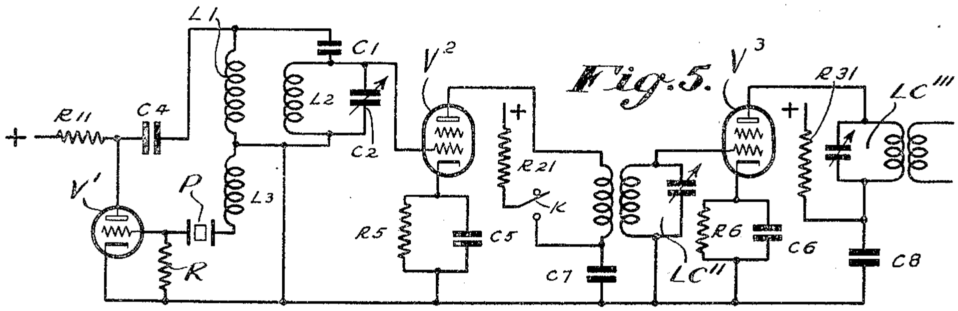
Figure 4:
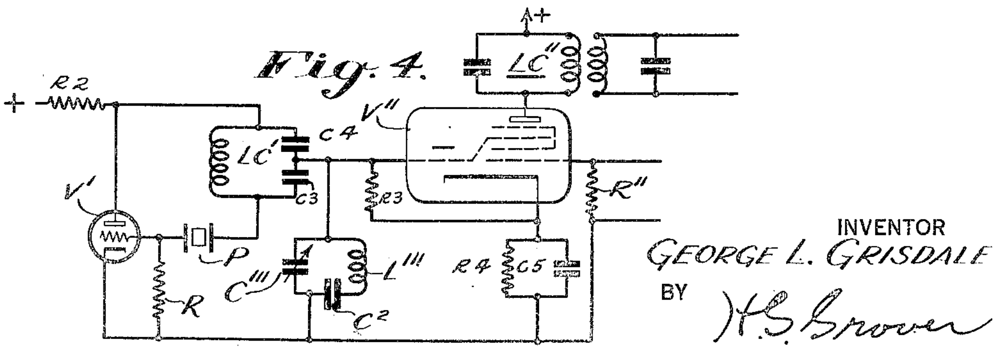

In the drawings, Figs. 1 and 2 show two different embodiments of an oscillation generator in accordance with the invention; Fig. 3 is a curve given in explanation of the operation of the invention; Fig. 4 shows the oscillation generator of the invention applied to a superheterodyne receiving system; and Fig. 5 shows the oscillation generator of the invention applied to coupled amplifier stages.

The generator illustrated in Figure 1 is a modified Colpitts generator including a thermionic valve V′ whose anode is connected to one end of an LC′ tuned oscillatory circuit whose other end is connected through an impedance and a source of anode current to the cathode, and through a piezo-electrical crystal P to the control grid, which is connected to the cathode through a grid-leak resistor R′. In the capacitative branch of the LC tuned circuit are two series connected capacitors C′ and C″, the junction point of which, in normally established generators, is connected directly to the cathode of the valve. For the purpose of the present invention, the connection between the junction point of the said two capacitors and the said cathode includes an inductor (for convenience referred to as L‴) of small inductive value.

The generator illustrated in Figure 2 is a tuned-anode generator employing regenerative feed back. It includes a thermionic valve V′ whose anode is coupled through a blocking capacitor $C^0$ to one end of an LC′ tuned circuit whose other end is connected to the cathode. The anode is also connected through a load impedance, to the positive terminal of a source of anode direct current. The grid of the valve is connected through a grid leak resistor R to the cathode of the valve and also through a piezo-electric crystal P and an inductor L″ to the cathode, the said inductor being magnetically coupled to the inductive branch L′ of the LC′ tuned circuit. In series, in the capacitative branch of the LC′ tuned circuit, with the capacitor thereof is included an inductor L″ of small inductive value.

In these arrangements, when the circuit is generating oscillations, the anode current of the valve carries components of oscillatory currents at the fundamental frequency and at the harmonic frequencies. All these components pass from the anode to the cathode through the LC′ tuned circuit but since, to the components at harmonic frequencies, capacitor C′ in the Colpitts generator or the capacitor C in the tuned anode generator offers a lower impedance than does the inductive branch, nearly all the currents of harmonic frequencies pass through capacitors C′ or C and inductor L‴. Those currents in $L'''$ produce or are accompanied by oscillatory electro-motive forces at harmonic frequencies across $L'''$, from across which harmonic-frequency output may be taken.

The inductive value of inductor $L'''$ is of importance. The stray capacity across inductor $L'''$, and in the wiring and so forth, may be regarded as concentrated in a capacitor $C'''$ shown in dotted lines across inductor $L'''$. This capacitor $C'''$ will, at some frequency, resonate inductor $L'''$. The inductive value of $L'''$ should therefore be selected with due regard to the capacitative value of $C'''$, such that the resonant frequency of $L'''C'''$ is slightly higher than that of the harmonic or range of harmonics required.

Figure 3 of the accompanying drawing shows how the impedance of $L'''C'''$ varies with frequency. The graph of Figure 3 relates to a case in which the inductance of $L'''$ was $0.8\mu h$. and the capacitance of $C'''$ was $20\mu\mu f$. The Q value of $L'''$ is assumed to be 10. Harmonics up to 40 mc./s. are required, and $L'''C'''$ is therefore resonant at 40 mc./s. At frequencies up to 40 mc./s., the impedance is seen to rise whilst the amplitude of the harmonic currents falls, with increasing frequency. Thus the harmonic potential remains substantially constant for frequencies up to the resonant frequency of $L'''C'''$, beyond which, since the impedance falls, the harmonic potentials fall also.

For some purposes it may be desired to select any particular one of a number of harmonics of the fundamental frequency, as when the oscillation generator serves as the source of local oscillations in a superheterodyne receiver. In such a case the capacitor (stray capacities) $C'''$ may be a physical capacitor (see Figure 4 of the accompanying drawing) itself variable to vary to resonant frequency of the resonant circuit $L'''C'''$, or the inductor $L'''$ may be variable. Circuit $L'''C'''$ should be sharply tuned to the required harmonic. Such a receiver would serve to receive signals on a large number of harmonic frequencies of a given fundamental frequency. The harmonic frequency selected, is applied to the third grid of a mixer valve $V''$ and received signal, appearing across $R''$ is applied to the first grid. Output is taken from the anode tuned circuit $LC''$. Thus if it is required to receive signals on a large number of harmonics of 400 kc./s. for example 800, 1200, 1600 . . . 8000, 8400 . . . kc./s., the crystal oscillator might be such as to operate at a frequency of 400 kc./s. and the intermediate frequency of the receiver would be 400 kc./s. or a multiple thereof. Condenser $C^2$ is a tracking condenser to enable the oscillator circuit to be ganged with the high frequency tuning circuits.

The harmonic output, taken from across the inductor $L'''$, or the tuned circuit $L'''C'''$ may be further purified from unwanted harmonic or fundamental frequencies by being applied, as indicated in Figure 5 of the accompanying drawing, to coupled amplifier stages the coupling between stages being LC circuits ($LC''$ and $LC'''$) resonant at the frequency of the desired harmonic. The usual gang-control between stages may, of course, be provided.

Fig. 4 refers to the frequency changer system of a superheterodyne receiver for the reception of signals which occur at a fixed frequency interval apart, say F. Then P is an oscillating crystal having a resonant frequency F; the tuned circuit $LC'$ is also tuned to F and with P short circuited would form a Colpitts oscillator with the triode valve $V'$. R is a grid resistance which gives bias to the valve under oscillating conditions and $R_2$ is the resistance feeding anode current to the valve. $C_4$ and $C_3$ in series form the tuning capacitance $C'$ of the circuit. The tuned circuit $C'''$, $C^2$, $L'''$ is tuned to harmonics of the crystal oscillator frequency, the particular harmonic required being selected by the tuning condenser $C'''$. This may be part of a ganged condenser of a receiver, the other sections of the condenser being used for signal frequency tuning in the usual way. The series condenser $C^2$ is so dimensioned that the circuit $L'''C'''C^2$ tunes to a frequency above the signal frequency by an amount equal to the intermediate frequency of the receiver. Resistance $R_3$ provides bias for the frequency changer valve $V''$ by virtue of the grid current flowing in $R_3$. $R_4$ is a cathode resistor supplying bias to the hexode section of the frequency changer and $C_5$ is a condenser to ensure that no high frequency voltage is set up across $R_4$. $R''$ is a grid resistor of the frequency changer $V''$ across which the signal voltage is applied. $LC''$ is the anode tuned circuit of the frequency changer from which the output of the frequency changer is taken.

If $f_1$, $f_1+F$, $f_1+2F$, $f_1+3F$ are the frequencies of signals to be received and F is the crystal oscillator frequency, the circuit $C'''L'''C^2$ must tune in turn to harmonics $n$F of the oscillator frequency, where $n$ is an integer. Thus the intermediate frequency $f_2$ must be such that $$nF-f_1=f_2$$
$$(n+1)F-(f_1+F)=f_2$$
$$(n+2)F-(f_1+2F)=f_2$$

By tuning the harmonic selecting condenser $C'''$ to amplify the harmonic $(n+2)F$ a signal of $f_1+2F$ may be received.

Fig. 5 shows the early stages of a transmitter in which it is desired to radiate at any of a number of frequencies differing by a constant frequency F by selection of harmonics from the crystal P of frequency F.

The valve $V'$ maintains in oscillation the tuned circuit $L_1C_1$ (regarding $L_2$ and $C_2$ as short circuited). $L_3$ is a feed-back coil coupled to $L_1$ and feeding back energy to the grid of $V'$ through the crystal P. R is the grid leak resistance. Such a circuit may be made to oscillate at the resonant frequency of the crystal.

The anode current of $V'$ is rich in harmonics and the harmonic content will tend to flow through the capacitative path $C_4C_1$ to earth. If $L_2C_2$ is tuned to a required harmonic frequency of the crystal, voltage at this harmonic frequency will be built up across $L_2C_2$ and other harmonics will be comparatively small.

The harmonic voltage is amplified in the valves $V_2$ and $V_3$ and further filtered in the circuits $LC''$ and $LC'''$ $R_5C_5$ and $R_6C_6$ may be resistance condenser combinations to give bias to the valves and to be of low impedance at the working frequency. K is a key for interrupting the anode current to the amplifier $V_2$ if the output is to be keyed. $R_{11}$, $R_{21}$ and $R_{31}$ are resistances supplying the valves with anode potential and $C_7$ and $C_8$ are condensers to by-pass radio frequency currents to earth.

What is claimed is:

1. An oscillation generator comprising a vacuum tube having an anode, a cathode and a grid, a parallel tuned circuit in series with a crystal coupled between said anode and grid, said tuned circuit comprising two branches one branch of which includes an inductance and the other branch of which includes two capacitors in series, one of said capacitors having such value as to offer a lower impedance to currents of harmonic frequencies than the impedance offered by said one inductance branch to currents of harmonic frequencies, a lead connecting the junction of said capacitors to one terminal of an inductor, said last inductor having capacitance thereacross and having such selected value as to resonate with said capacitance at a frequency substantially equal to a desired harmonic of the fundamental frequency of said generator, said last inductor having a lower reactance value at the fundamental frequency than said one capacitor of the parallel tuned circuit, to thereby minimize detuning of said oscillation generator.

2. A crystal-controlled oscillation generator comprising a vacuum tube having a cathode, an anode, and a grid, a parallel tuned circuit comprising two branches one of which includes an inductance and the other includes a capacitor, said capacitor having such value as to offer a lower impedance to currents of harmonic frequencies than the impedance offered by said one inductance branch to currents of harmonic frequencies, a lead connecting said capacitor to one terminal of an inductor, said last inductor having capacitance thereacross and having such selected value as to resonate with said capacitance at a frequency substantially equal to a desired harmonic frequency, said inductor forming a series circuit with said capacitor which together constitute one of the branches of said parallel tuned circuit, a connection from said anode to one terminal of said parallel tuned circuit, a connection from said cathode to the other terminal of said parallel tuned circuit, and a series circuit of piezo-electric crystal and another inductor connecting said grid to said last terminal of said tuned circuit, said last inductor being magnetically coupled to said inductance of said parallel tuned circuit, and an output circuit connected across said first inductor for deriving energy of a harmonic frequency.

3. An oscillation generator comprising a vacuum tube having an anode, a cathode and a grid, a parallel tuned circuit in series with a crystal coupled between said anode and grid, said parallel tuned circuit comprising two branches one of which includes an inductance and the other includes two capacitors in series, at least one of said capacitors having such value as to offer a lower impedance to currents of harmonic frequencies than the impedance offered by said one branch to currents of harmonic frequencies, a connection from the junction of said capacitors to one terminal of an inductor, said last inductor having capacitance thereacross and having such selected value as to resonate with said capacitance at a frequency substantially equal to a desired harmonic of the fundamental frequency of said generator, and an output circuit connected across said inductor for deriving said desired harmonic frequency.

4. An oscillation generator comprising a vacuum tube having an anode, a cathode and a grid, a parallel tuned circuit in series with a piezoelectric crystal, for stabilizing the frequency of operation of said generator, coupled between said anode and grid, said parallel tuned circuit comprising two branches one of which includes an inductance and the other includes a capacitor, said capacitor having such value as to offer a lower impedance to currents of harmonic frequencies than the impedance offered by said one inductance branch to currents of harmonic frequencies, a lead connecting said capacitor to one terminal of an inductor, said last inductor having capacitance thereacross and having such selected value as to resonate with said capacitance at a frequency substantially equal to a desired harmonic of the fundamental frequency of said generator, said last inductor having a lower reactance value at the fundamental frequency than said capacitor of the parallel tuned circuit, to thereby minimize detuning of said oscillation generator.

GEORGE LAMBERT GRISDALE.

REFERENCES CITED

The following references are of record in the file of this patent:

UNITED STATES PATENTS

| Number | Name | Date |
|---|---|---|
| 1,530,498 | Kendall | Mar. 24, 1925 |
| 1,673,173 | Worrall | June 28, 1928 |
| 1,719,521 | Schaffer | July 2, 1929 |
| 1,957,269 | Hund | May 1, 1934 |
| 1,982,916 | Kummerer | Dec. 4, 1934 |
| 2,013,806 | Osnos | Sept. 10, 1935 |
| 2,066,038 | Herold | Dec. 29, 1936 |
| 2,332,102 | Mason | Oct. 19, 1943 |
| 2,352,455 | Summerhayes | June 27, 1944 |
| 2,459,557 | Usselman | Jan. 18, 1949 |